United States Patent [19]

Parkison et al.

[11] Patent Number: 4,609,006
[45] Date of Patent: Sep. 2, 1986

[54] DIVERTER

[75] Inventors: Richard G. Parkison, Louisville, Ky.; George E. Phillips, Oshkosh, Wis.

[73] Assignee: American Standard Inc., New York, N.Y.

[21] Appl. No.: 676,042

[22] Filed: Nov. 29, 1984

[51] Int. Cl.$^4$ .............................................. F16K 11/02
[52] U.S. Cl. ................................... 137/119; 137/854; 137/860
[58] Field of Search ............... 137/116, 119, 854, 860; 138/45, 46

[56] References Cited

U.S. PATENT DOCUMENTS 2,949,933  8/1960  Moen ............................. 137/119 X
3,336,935  8/1967  Ward ................................... 137/119
4,008,732  2/1977  Ficher ................................. 137/119

Primary Examiner—Alan Cohan
Attorney, Agent, or Firm—Robert G. Crooks; James J. Salerno, Jr.; John P. Sinnott

[57] ABSTRACT

A small, reliable diverter valve that maintains a relatively constant flow through a spray nozzle in spite of water supply pressure fluctuations and that positively terminates flow from the faucet spout during hand spray operation. A variable elasticity cup seal keeps constant area passageway to the spray nozzle in spite of water supply fluctuations. A normally open path, moreover, enables air to flow from the spout into the water supply system in conditions of negative supply pressure and thereby assists the cup seal in preventing backflow from the spray nozzle into the fresh water supply.

1 Claim, 5 Drawing Figures

DIVERTER

TECHNICAL FIELD

This invention relates to plumbing fittings and, more particularly, to a diverter valve for a plumbing fitting that enables water to flow either from a spout or from a hand operated spray, and the like.

BACKGROUND ART

It is surprising that a relatively commonplace plumbing fitting, such as a diverter valve that permits water to flow either from a faucet or from a hand spray in a household or commercial sink arrangement must satisfy a number of conflicting and quite important demands. Illustratively, diverter valves of this nature must completely terminate the flow of water from the spout when flow is desired from the hand spray. To achieve this relatively commonplace goal, rather large diverter valves that are expensive and difficult to install have been required. Smaller valves, in contrast, nevertheless permit water to flow from spouts during hand operation generally because the smaller sizes of the seals in the pilot valves that divert the water flow do not permit forces of sufficient magnitude to be developed to completely seat the seal within the valve. As a consequence, these valves tend to "stick" in a partially open condition that fails to terminate flow from the spout.

The diverter valve, moreover, aside from its function as an item of modern plumbing equipment, also must prevent absolutely the reverse flow of impure or contaminated water into a municipal fresh water distribution system. For example, if the spray valve is, for some reason, kept open and the spray nozzle is immersed in contaminated water, this contaminated water will be drawn into the municipal water supply if that supply is subjected to a vacuum or a negative pressure. This is not a particularly remote possibility.

The combination of a spray valve jammed in an open position while the spray nozzle is submerged in dishwater at the same time that fire-fighting requirements are producing a negative pressure or vacuum in the municipal water distribution system is not at all far-fetched in view of the large number of spray and faucet combinations that are likely to be found in any community within the United States sharing a common water supply. The danger to public health that contamination of this nature will cause is almost self-evident and every possible effort must be made to avoid such a hazard.

Through the years there have been a number of proposals to reconcile these diverse and somewhat conflicting diverter valve requirements in a device that not only enjoys a long and maintenance-free life, but also uses few parts and is available at a competitive price. These proposals, however, failed to satisfy all of these needs in the same device. Illustrative of these proposals are the following United States patents:

U.S. Pat. No. 2,939,474, granted to B. J. De Simone et al on June 7, 1960 for "Portable Diverter Valve" shows one of the large, cumbersome devices that are attached to the end of a spout, rather than concealed within the fitting structure.

U.S. Pat. No. 3,232,307, granted to E. H. Bucknell et al on Feb. 1, 1966 for "Transfer Valve" also discloses another large and cumbersome apparatus.

U.S. Pat. No. 3,336,935, granted to I. A. Ward et al on Aug. 22, 1967 for "Diverter" also described another cumbersome and bulky valve structure.

U.S. Pat. No. 3,376,884, granted to E. H. Bucknell et al on Apr. 9, 1968 for "Anti-Siphon Diverter Unit" also fails to satisfy industrial and consumer needs for the same reason as the '935 patent mentioned above.

U.S. Pat. No. 3,433,264, granted to R. G. Parkison on Mar. 18, 1969 for "Noise Reduction Structure For Mixing Valve" describes a faucet fitting, but does not disclose a diverter valve function.

U.S. Pat. No. 3,459,207, granted to K. G. Bacheller on Aug. 5, 1969 for "Faucet Construction" also describes another large and bulky diverter valve.

U.S. Pat. No. 3,754,709, granted to K. A. Laatsch on Aug. 28, 1973 for "Hose Nozzle With Discharge Control" describes an apparatus that also fails to satisfy the need for a small, compact diverter valve.

U.S. Pat. No. 3,895,643, granted to I. A. Ward on July 22, 1975 for "Valve Assembly" describes still another bulky and difficult to install diverter valve.

U.S. Pat. No. 3,906,983, granted to R. G. Parkison on Sept. 23, 1975 for "Diverter Valve" shows an apparatus that requires manual operation in contrast to a more desirable reliance upon an application of hydraulic forces to produce the necessary diverter valve operation.

DISCLOSURE OF THE INVENTION

A typical embodiment of the invention provides a relatively inexpensive diverter valve structure that is compact, requires few parts and is positive in operation with respect to terminating flow either from the faucet when the hand spray is operated, or from the hand spray to the water supply if the distribution system becomes subject to a negative pressure.

This is largely accomplished through a variably resilient cup seal in the diverter valve. The peripheral portion of the cup seal increases its resistance to deformation in response to the progressive increase in applied water pressure. By increasing the "stiffness" of the cup seal relative to the hydraulic force that is applied to the seal, the annular clearance between the circumference of the seal and the adjacent wall of the spray hose fitting remains essentially constant. In this way, flow at higher pressures causes a greater pressure drop across the cup seal, which results in a force that is sufficient to firmly seat a stem seal in a valve in order to stop all flow from the spout during hand spray operation. Conversely, at low pressure, the diverter valve does not "stick" in one operating condition because the greater resiliency of the cup seal at these lower pressures continues to permit positive valve action.

Further in accordance with the invention, a normally open path is provided between the spout and the passageway to the water supply in order to prevent contaminated water backflow from the hand spray nozzle. As negative pressure develops in the water supply, the annular seal remains away from its seat to establish a passageway between the spout and the water supply. Air then flows into the water supply, while water in the spray handle side of the cup seal forces the periphery of the seal to flex in a radially outward direction and press against the wall of the spray hose fitting. This seals the cup seal against the fitting, thereby positively preventing backflow from the spray to the water supply.

A device built in accordance with the principles of this invention, moreover, requires significantly fewer parts than previously know devices and provides positive termination of flow from the faucet during hand spray operation or backflow under low water supply pressure conditions, at a competitive price. As a final and noteworthy point, a valve that characterizes the invention also satisfies the 1982 requirements of American Society of Sanitary Engineers Code 1025.

BEST MODE OF CARRYING OUT THE INVENTION

Figure 1:
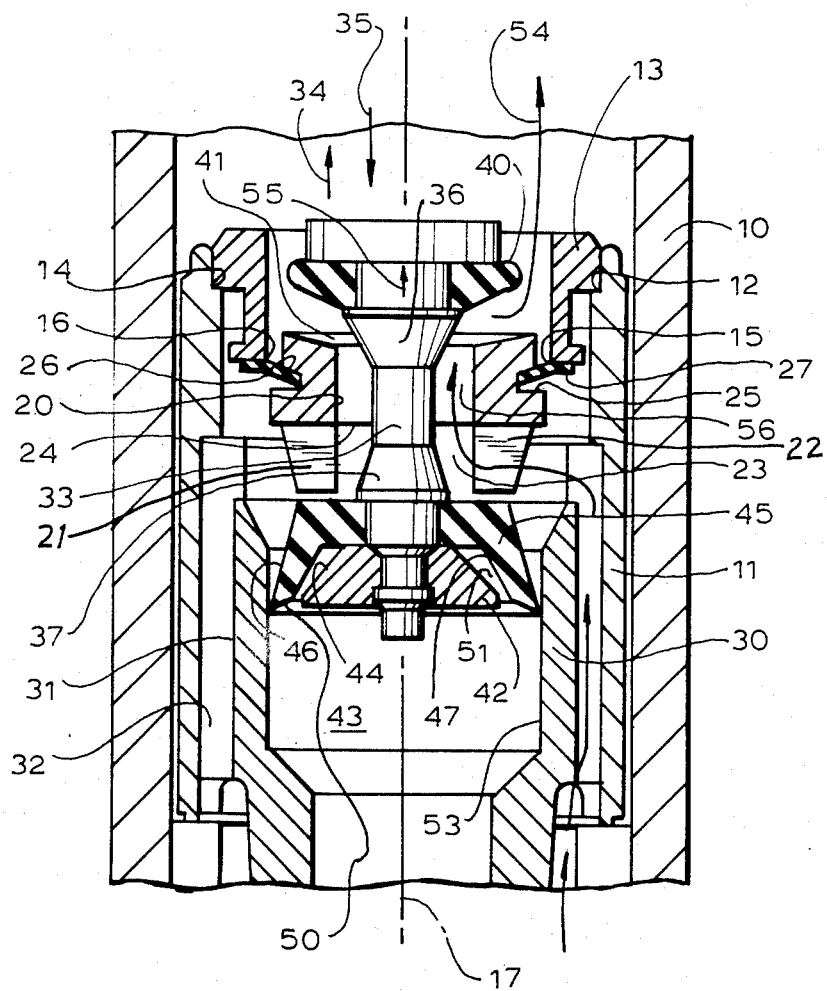
FIG. 1 is a front elevation in full section of a typical embodiment of the invention, with water emitting from the spout.

For a more complete appreciation of the invention, attention is invited to FIG. 1, which shows a generally tubular water conduit 10 in which an hollow and cylindrical mounting 11 is secured. The mounting 11 has an interior annular flange 12 formed at the end that is closest to the spout (not shown) of the faucet structure of which the conduit 10 may be a part. A diverter housing 13, formed in an hollow cylindrical shape, is seated within the mounting 11 to enable an annular shoulder 14 on the housing to bear against the adjacent surface of the flange 12 in order to support the housing within the mounting. The shoulder 14 can be welded to the flange 12 in order to permanently fix the diverter housing within the water conduit 10.

The diverter housing 13 has a number of passageways 15, 16 which are parallel with a cylindrical axis 17 of the water conduit 10, the mounting 11, and the diverter housing 13. Spaced inwardly from the passageways 15 and 16 and integral with the diverter housing 13, is an hollow frustroconical spacer 20 which has a number of radially oriented and axially protruding pins, of which only 21, 22 are shown in the drawing. Adjacent pairs of these pins establish flow passageways 23, 24. The outer surface of the spacer 20, moreover, that is immediately adjacent to the terminations of the passageways 15 and 16, has a transverse annular slot 25 in which the slot side that is closest to the spout (not shown) is bevelled to provide a sloping surface 26 that forms an acute angle with the axis 17 of about 60°.

A resilient annular seal 27 is lodged within the slot 25 in order to flex under pressure against the sloping surface 26, illustrated in FIG. 2, to obstruct the passageways 15 and 16 and to selectively block fluid flow through these passageways as described subsequently in more complete detail. A cylindrical spray hose fitting 30, is also lodged within the mounting 11. The fitting 30, fixed within the mounting 11 (see FIG. 1), also has a generally hollow cylindrical shape that is aligned with the cylindrical axis 17. The outer surface of the fitting 30 is spaced inwardly from the inner surface of the mounting 11 in order to form a passageway 31. Further in this respect, the hose fitting 30 is joined at regular, spaced circumferential points to the inner surface of the mounting 11 by means of radially oriented webs 32. It is these webs 32 that form several passageways of which only the passageway 31 is shown in FIG. 1.

A diverter stem 33 is received within the hollow center of the spacer 20. The stem 33 also is in longitudinal alignment with the axis 17 and enjoys a limited freedom of movement in axial directions as indicated by arrows 34 and 35. The central portion of the diverter stem 33 has two oppositely oriented frustroconical sections 36, 37, the section 36 being oriented with its base disposed on the spout side of the conduit 10 in the direction of the arrow 34. The conical section 37, however, is space longitudinally from the section 36 and is disposed with the base oriented in the direction of the arrow 35.

As illustrated, a flexible stem seal 40, formed preferably of rubber or other suitable elastic material, has an annular conical shape that is disposed in the same direction as the section 36 on the stem 33. The apex of the seal 40 matches the diameter of the abutting conical section 36 to enable the section to serve as a stop limiting the longitudinal movement of the stem seal 40 in the direction of the arrow 35.

As shown in the drawing, bevelled surface 41 of the spacer 20 that is opposite to the conical surface of the stem seal 40 does not match the angle of the seal's outer surface 40. Thus, it has been found in accordance with a salient feature of the invention, that for best results the stem seal 40 is preferably of 90 durometer rubber material and that the sloping conical face should form an angle of 25° with a transverse plane. The bevelled surface 41, upon which the seal 40 seats, should form an angle of about 5° relative to the same transverse plane. It is unquestionably surprising that a better seal and more positive flow termination is achieved through seal and bevel angles that do not match each other. However, upon closer examination it can be seen that the first line contact as the two parts touch is the inner edge of the bevelled surface 41 where the area is least and the sealing pressure greater.

In accordance with another feature of the invention, a seal retainer 42, formed of Delrin or the like, is secured to the end of the diverter stem 33 that is opposite to the end that accommodates the stem seal 40. The retainer 42 also is spaced longitudinally from the pins 21, 22 and is dispoed within recess 43 formed in the end of the spray hose fitting 30. Attention is particularly invited to a sloping, or conical surface 44 on the seal retainer 42. Note that the apex of the conical surface 44 is oriented in the same longitudinal direction as the arrow 34 and is in axial alignment with the stem 33. Illustratively, the conical surface 44 forms a 45° angle with a plane transverse to the axis 17.

Interposed between and securely clamped between the base section 37 and the truncated apex of the seal retainer 42 is a cup seal 45 of rubber or other suitable elastic material. As shown in FIG. 1, the cup seal 45 has an outer conical surface 46 that forms an angle of 16° 30' with cylindrical axis 17. Two inner conical compound surfaces 47 and 50 also are formed in the cup seal 45. The innermost conical surface that is adjacent to the base of the section 37 forms an angle of 35° with the axis 17, and the peripheral inner conical surface 50 at the rim of the cup seal 45 enjoys an angle of 30° with respect to a plane transverse to the axis 17. Mounted on the diverter stem 33, the surfaces 47 and 50 of the cup seal 45 in combination with the opposing surface 44 of the seal retainer 42 establish an annulated void space 51.

Figure 4:
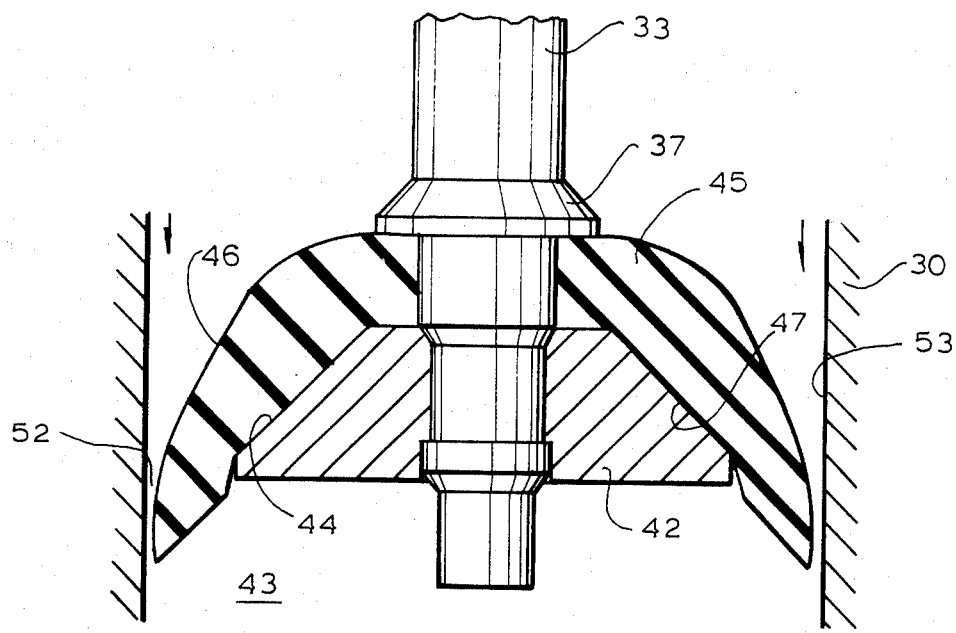
FIG. 4 is a full section front elevation of a cup seal in accordance with another feature of the invention in which the cup seal is subjected to relatively high hydraulic pressure.
Figure 5:
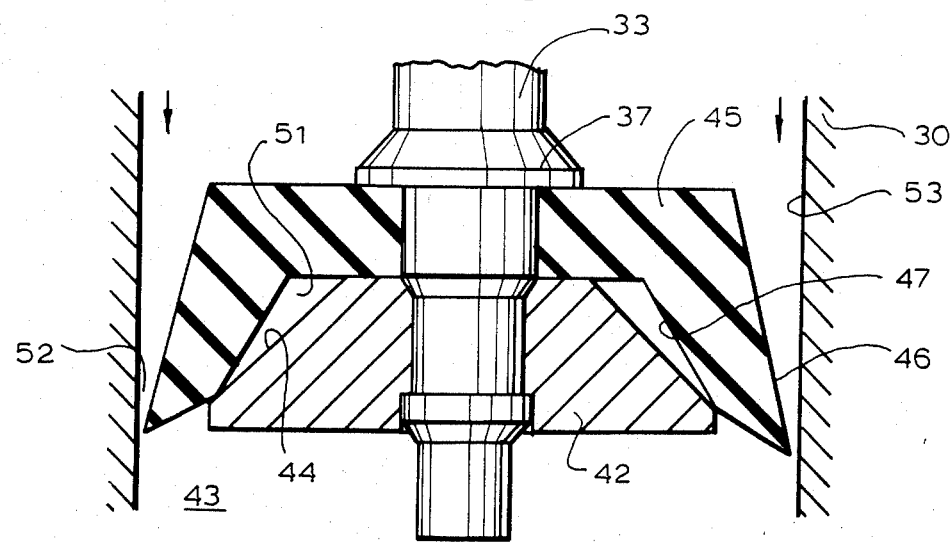
FIG. 5 is a front elevation in full section of the cup seal that is shown in FIG. 4 in a condition of lower applied hydraulic pressure.

Attention now is invited to FIG. 5. This figure shows more clearly the relationship between the conical surface 44 of the seal retainer 42 and the adjacent conical inner surfaces 47 and 50 of the cup seal 45 in a condition of relatively low hydraulic pressure that is established when the valve in the hand spray (not shown) is opened to produce atmospheric pressure in the recess 43. Now refer to FIG. 4. An higher hydraulic pressure applied to the outer conical surface 46 of the cup seal 45 causes the cup seal to flex inwardly toward the stem 33 and to press portions of the seal's inner surface 47 against the circumference of the conical surface 44 of the seal retainer 42. The difference in slope between the inner surface 47 and the outer surface 44 that forms the annulated void space 51 imparts to the elastic cup seal 45 a variable resistance, or stiffness, that increases with the applied hydraulic pressure to increasingly restrict the annular clearance 52 between the adjacent wall 53 of the spray hose fitting 30, and the seal periphery with increasing applied hydraulic pressure. Such increase in restriction caused by the restricted clearance 53 tends to maintain fairly constant flow regardless of variations in the inlet pressure.

Note, particularly, in connection with the cup seal 45 (FIG. 1) that the circumferential edge of the cup seal bears against the adjacent portion of the wall 53 of the recess 43 to form an essentially fluid tight seal when the stem 33 shifts in the direction of arrow 34. This condition occurs when the spray head is in the closed position and the faucet valve is opened with water under pressure entering passageway 31. This pressure is equalized across cup seal 45 but creates a pressure differential across seal 40 since the spout is open to atmosphere. Water therefore flows to the spout.

Because it is desirable to maintain relatively a fairly constant flow of water from hand spray (not shown) in spite of water supply pressure fluctuations, the variable resiliency of the cup seal 45 maintains effectively the same annular clearance 52 at higher water supply pressures as that which was formed through the action of lower pressure. Illustratively, as shown in FIG. 4, higher fluid pressures on the conical section 37 side of the stem 33 presses the inner conical surface 44 progressively against the corresponding surface of the seal retainer 42 until the annulated void space 51 (FIGS. 1 and 5) disappears completely. This action presses the outer surface 46 of the cup seal 45 into a generally arcuate configuration (FIG. 4) in which the clearance 52 between the surface 46 and the adjacent portion of the wall 53 remains essentially constant. Thus, the progressive resistance of the cup seal 45 to increased hydraulic pressure maintains a fairly constant flow from the spray handle in spite of marked changes in water supply pressures until the FIG. 4 condition is reached.

Figure 2:
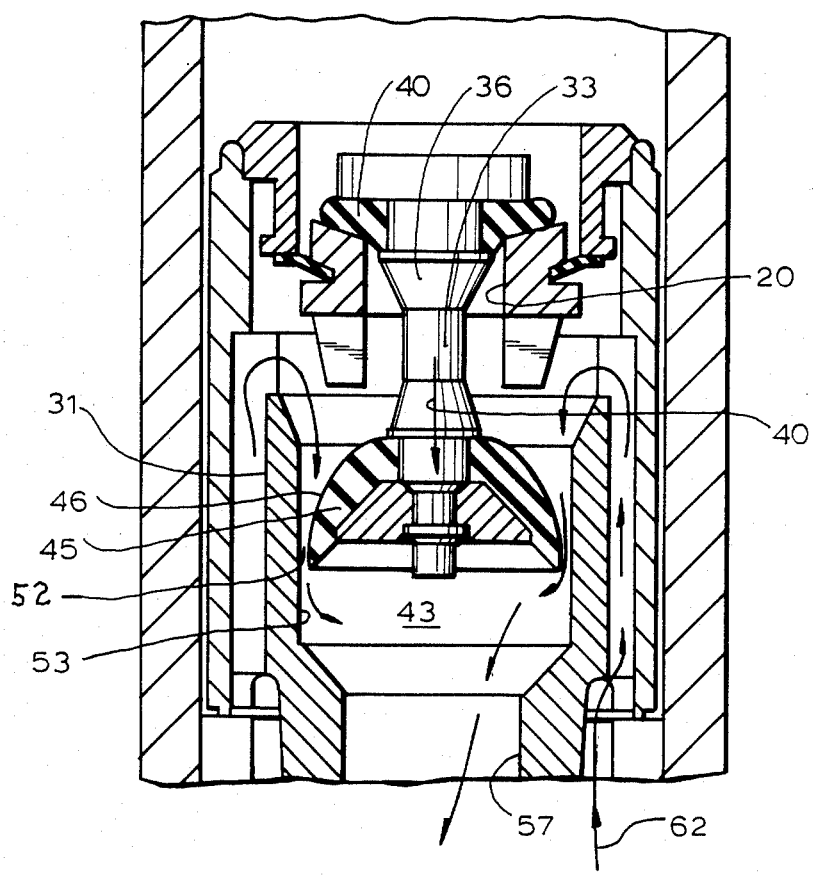
FIG. 2 is a front elevation in full section of the embodiment of the invention shown in FIG. 1 in hand spray operation.

Turning now to FIG. 2, the clearance 52 provided by the cup seal 45 enables water from the supply to flow in the direction of arrow 62 that includes the annular passageway 31, the clearance 52 formed between the cup seal outer surfce 46, the wall 53, the recess 43 and a conduit 57 to the spray nozzle (not shown).

It will be recalled that an important safety feature of the instant invention is the manner in which the cup seal 45 prevents a backflow of contaminated water into the fresh water supply if an open spray nozzle (not shown), is subjected to a vacuum or negative fresh water supply pressure.

Figure 3:
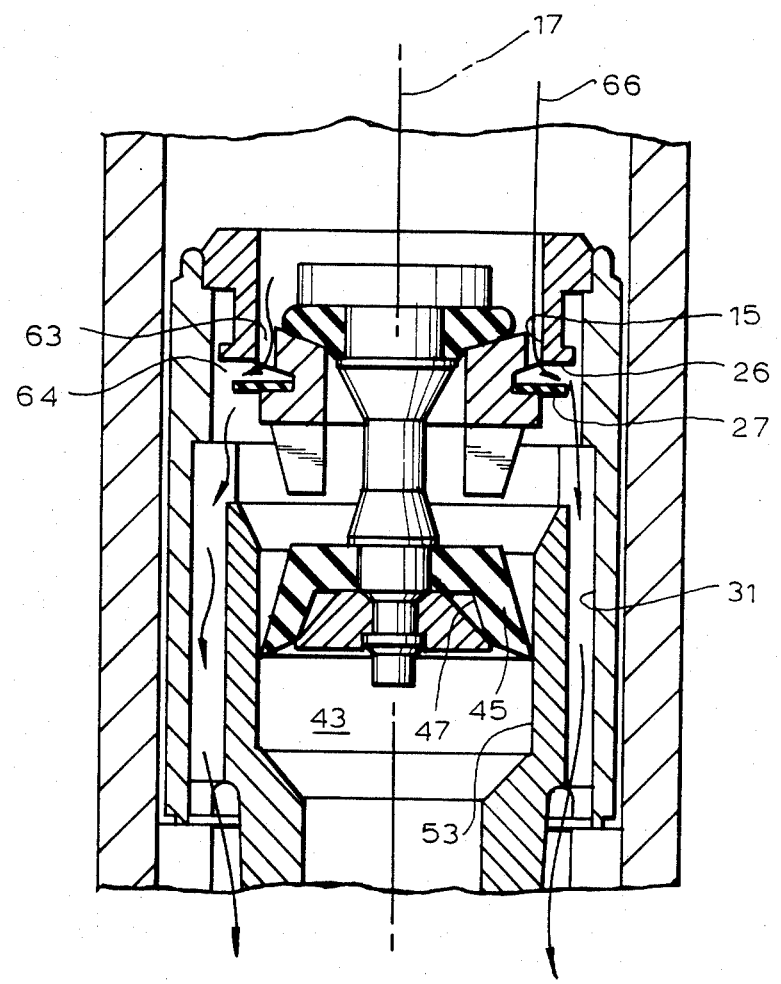
FIG. 3 is a front elevation in full section of the embodiment of the invention shown in FIGS. 1 and 2 under a condition of negative water supply pressure.

For a better appreciation of this characteristic of the invention, attention now is invited to FIG. 3 which shows the inner surface 47 of the cup seal 45 subjected to a relatively higher fluid pressure within the recess 43 than that pressure to which the outer conical surface 46 of the cup is subjected. This pressure difference presses the rim of the cup seal 45 outwardly to form a fluid-tight seal with the wall 53 of the recess 43. This fluid-tight relationship blocks contaminated water from flowing from the recess 43 into the annular passageway 31 and back toward the fresh water supply. In order to maintain this pressure difference across the cup seal 45, that prevents contaminated water backflow, air at atmospheric pressure is drawn from the spout (not shown) into the passageway 31 on past annular seal 27 shown in its normal position. Air from the spout then follows a path through the diverter valve in the direction of arrows 66 that includes the passageways 15, 16 and the passageway 31.

Thus, there is provided, in accordance with the invention, a compact, positively acting diverter valve that permits flow either to the spout or to a spray nozzle. In the spray nozzle mode of operation, moreover, the diverter valve that characterizes the invention effectively terminates flow from the spout.

A further safety feature made available through the invention prevents contaminated water from entering the fresh water supply by enabling air to flow preferentially from the spout to the water supply, and to block backflow through the spray apparatus.

INDUSTRIAL APPLICABILITY

This invention is useful in commercial and residential plumbing facilities that require faucet and spray handle water flow capabilities that will protect the fresh water supply from potentially contaminating backflow.

What is claimed is:

1. A diverter for selectively directing water flow to an hand spray nozzle and to a faucet spout and to block backflow from the nozzle to the water supply in conditions of negative supply pressure comprising, an hollow spray nozzle fitting in fluid communication with the hand spray nozzle, an elastic cup seal within said spray hose fitting for responding to relative pressure fluctuations between said fitting and the water supply to selectively interrupt fluid communication therebetween in order to establish flow from the faucet, a flexible seal for selectively establishing air flow from the faucet to the water supply in a condition of low supply pressure relative to said pressure within said spray hose fitting and in which said elastic cup seal also interrupts the flow between said fitting and the water supply, a stem seal for selectively directing water flow to the faucet spout as said cup seal engages said adjacent spray hose fitting portion when the spray nozzle is not being used, an hollow diverter housing, said housing having a beveled surface thereon for receiving said stem seal to selectively interrupt water flow to the faucet spout, said diverter housing having a plurality of air passageways formed therein and a slot formed in the surface thereof to receive said flexible seal to enable said seal to selectively block said air passageways, a diverter stem for supporting said cup seal and said stem seal thereon and to enable said seals to divert water flow through the diverter in response to relative pressures applied to the diverter, said cup seal having a compound inner conical surface, and a seal retainer on said diverter stem with said cup seal, said seal retainer being spaced from said compound conical surface to establish an annular void space therebetween to provide said elastic cup seal response to increasing water supply pressure to provide an increasing restriction between the cup seal and the adjacent portion of the spray hose fitting with increasing supply pressure so as to tend to maintain fairly constant flow from the spray nozzle.

* * * * *